US006856648B1

(12) United States Patent
Hyll (10) Patent No.: US 6,856,648 B1
(45) Date of Patent: Feb. 15, 2005

(54) METHOD AND APPARATUS FOR EQUALIZER UPDATING AND SAMPLING RATE CONTROL

(75) Inventor: Mattias Hyll, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 627 days.

(21) Appl. No.: 09/617,813

(22) Filed: Jul. 17, 2000

(51) Int. Cl.[7] .......................... H03H 7/30; H03H 7/40; H03K 5/159
(52) U.S. Cl. ...................... 375/232; 375/316; 375/355
(58) Field of Search ................................ 708/300, 322, 708/323; 375/229, 232, 233, 234, 259, 260, 316, 349, 350, 355

(56) References Cited

U.S. PATENT DOCUMENTS

| | | | | |
|---|---|---|---|---|
| 4,815,103 A | * | 3/1989 | Cupo et al. ................. | 375/234 |
| 4,975,927 A | | 12/1990 | Yoshida | |
| 5,031,197 A | | 7/1991 | Hespelt et al. | |
| 5,200,981 A | | 4/1993 | Carmon | |
| 5,414,732 A | * | 5/1995 | Kaufmann ................. | 375/232 |
| 5,642,385 A | | 6/1997 | Alberty | |
| 5,673,293 A | * | 9/1997 | Scarpa et al. ............... | 375/321 |
| 5,694,419 A | * | 12/1997 | Lawrence et al. .......... | 375/222 |
| 5,729,173 A | | 3/1998 | Sato | |
| 5,828,954 A | | 10/1998 | Wang | |
| 5,872,815 A | * | 2/1999 | Strolle et al. .............. | 375/321 |
| 5,894,334 A | | 4/1999 | Strolle et al. | |
| 6,005,893 A | * | 12/1999 | Hyll ......................... | 375/260 |
| 6,088,401 A | * | 7/2000 | Saito ........................ | 375/324 |
| 6,219,379 B1 | * | 4/2001 | Ghosh ....................... | 375/232 |
| 6,252,908 B1 | | 6/2001 | Tore | |
| 6,259,743 B1 | * | 7/2001 | Garth ........................ | 375/261 |
| 6,496,229 B1 | * | 12/2002 | Limberg .................... | 348/725 |
| 6,643,321 B1 | * | 11/2003 | Genossar et al. ........... | 375/219 |
| 6,687,292 B1 | * | 2/2004 | Garcia ....................... | 375/235 |

FOREIGN PATENT DOCUMENTS

| | | |
|---|---|---|
| EP | 0 368 307 A2 | 5/1990 |
| EP | 0 805 573 A2 | 11/1997 |

OTHER PUBLICATIONS

International Telecommunication Union, ITU–T, Telecommunication Standardization Sector of ITU, G.992.1 (6/99), Series G: Transmission Systems and Media, Digital Systems and Networks, Digital Transmission Systems—Digital Sections and Digital Line System—Access Networks.

* cited by examiner

Primary Examiner—Jean B. Corrielus
(74) Attorney, Agent, or Firm—Nixon & Vanderhye, P.C.

(57) ABSTRACT

Equalizer updating and accurate sampling rate control in a DMT receiver are simultaneously performed using a known signal, such as a pilot tone. The known signal is separated into its real and imaginary components. The equalizer uses separate mechanisms to process the real and imaginary components. The real component is used to control sampling rate timing in the receiver. The imaginary component of the received signal is used in an equalization adaptation procedure, e.g., updating an equalizer coefficient value. In one example embodiment, the real component of the received signal is set to zero for purposes of equalization, and the unequalized, real component is used to recover/track sampling rate timing. Because the real component has not been equalized, simultaneous timing recovery/tracking and equalization is achieved. Only the imaginary component is equalized and used to update the equalizer coefficient value. Thereafter, the unequalized real component and the equalized imaginary component are combined. In another example embodiment, a real-valued equalizer coefficient is determined for the known signal. Both real and imaginary components of the known sigal are equalized with the real-valued equalizer coefficient. The so-equalized real component adapts to a normalized amplitude for the timing control signal which is desirable in certain timing control applications. The equalized real and imaginary components are combined. The equalizer coefficient is updated using only the imaginary component of the received signal.

34 Claims, 8 Drawing Sheets

Transient Response for 0dB attenuation

Fig. 12

Transient Response for 3dB attenuation

*Fig. 13*

Transient Response for 6dB attenuation

*Fig. 14*

Transient Response for 12dB attenuation

METHOD AND APPARATUS FOR EQUALIZER UPDATING AND SAMPLING RATE CONTROL

FIELD OF THE INVENTION

The present invention relates to communications systems, and more particularly, to equalization and to sampling rate recovery and tracking. One particularly advantageous application is to Discrete Multitone (DMT) systems.

BACKGROUND AND SUMMARY OF THE INVENTION

Digitally modulated signals are equalized to minimize the effect of non-ideal phase and frequency characteristics of a transmitter, a receiver, and the communication channel between the transmitter and the receiver. Non-ideal channel characteristics produce different phase delays and attenuations for different signal frequency components. In addition to equalization, timing and sampling rate adjustments are also performed in a digital receiver. A pilot tone or other known signal may be used at the receiver to recover and track the sampling rate of the signal transmitter. For simplicity, the term "pilot tone" or "pilot" is used hereinafter to include any signal used to recover and/or track the sampling rate. Information about misalignment of the pilot tone may be used in a phase-locked loop to "lock" the sampling rate of the receiver's analog-to-digital converter to the timing of the transmitter.

In a Discrete MultiTone (DMT) system, the receiver may employ a frequency domain equalizer (FEQ) to compensate for the attenuation and phase distortion caused by the communications channel. Although this is the proper function of an equalizer, the frequency domain equalizer may also try to "compensate" the phase and magnitude of the received pilot, which may negatively impact the accuracy of the sampling rate recovery and tracking mechanism. One way to avoid this problem is to perform equalization and sampling rate recovery at different times, only using the pilot during periods when the equalizer is "off" for timing control. This approach, however, permits the sampling rate the opportunity to deviate unacceptably during the time period when the frequency domain equalizer is "on," and the pilot signal is not being used for timing control.

Another complicating factor is that the behavior of the sampling rate recovery control loop depends upon the amplitude of the control signal. The filter coefficients in the control loop filter, for example, typically are optimized for a certain loop gain and control signal amplitude in order to provide the desired transient response and sensitivity to noise. Therefore, training of the pilot's frequency domain equalizer coefficient(s) to achieve a normalized amplitude may also be important. This is also true if the pilot frequency is used for symbol synchronization.

The present invention provides a method and apparatus for simultaneous equalizer updating and sampling rate control that also resolves the problems identified above. A known signal, such as a pilot tone, is received and separated into its real and imaginary components. Separate mechanisms are used to process the real and imaginary components in an equalizer. One of the real and imaginary components, preferably the real component, is used to control sampling rate timing in the receiver. The imaginary component of the known signal is used in an equalization adaptation procedure, e.g., updating an equalizer coefficient value. However, the roles of the real and imaginary components may be reversed.

In one non-limiting, example embodiment, the real component of the known signal is set to zero for purposes of equalization. The unequalized, real component is used to recover/track sampling rate timing. Because the real component has not been equalized, the timing recovery/tracking is de-coupled from equalization. Only the imaginary component is equalized and used to update the equalizer coefficient value. Thereafter, the unequalized real component and the equalized imaginary component are combined.

In another non-limiting, example embodiment, a real-valued equalizer coefficient is determined for the known signal. Both real and imaginary components of the received signal are equalized with the real-valued equalizer coefficient. The so-equalized real component has a normalized amplitude for the timing control signal which is desirable in certain timing control applications. The equalized real and imaginary components are combined. The equalizer coefficient is updated using only the imaginary component of the known signal.

A receiver in accordance with the first example embodiment of the present invention includes an analog-to-digital converter for sampling the known signal, and an equalizer for equalizing the sampled signal except for a real component of the known signal. A timing control unit controls the sampling rate of the analog-to-digital converter using the unequalized, real component of the known signal. A receiver in accordance with the second example embodiment also includes an analog-to-digital converter, an equalizer, and a timing control unit. However, a real-valued equalizer coefficient is employed by the equalizer to update both real and imaginary components of the known signal. The so-equalized real component of the known signal controls the timing unit. However, the real-valued equalizer coefficient is updated using only the imaginary component and not the real component of the known signal.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION OF THE DRAWINGS

In the following description, for purposes of explanation and not limitation, specific details are set forth, such as particular embodiments, protocols, data structures, and techniques, in order to provide a thorough understanding of the present invention. However, it will be apparent to one skilled in the art that the present invention may be practiced in other embodiments that depart from these specific details. In other instances, detailed descriptions of well-known methods, systems, and devices are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an Application Specific Integrated Circuit (ASIC), and/or using one or more Digital signal Processors (DSPs).

Figure 1:
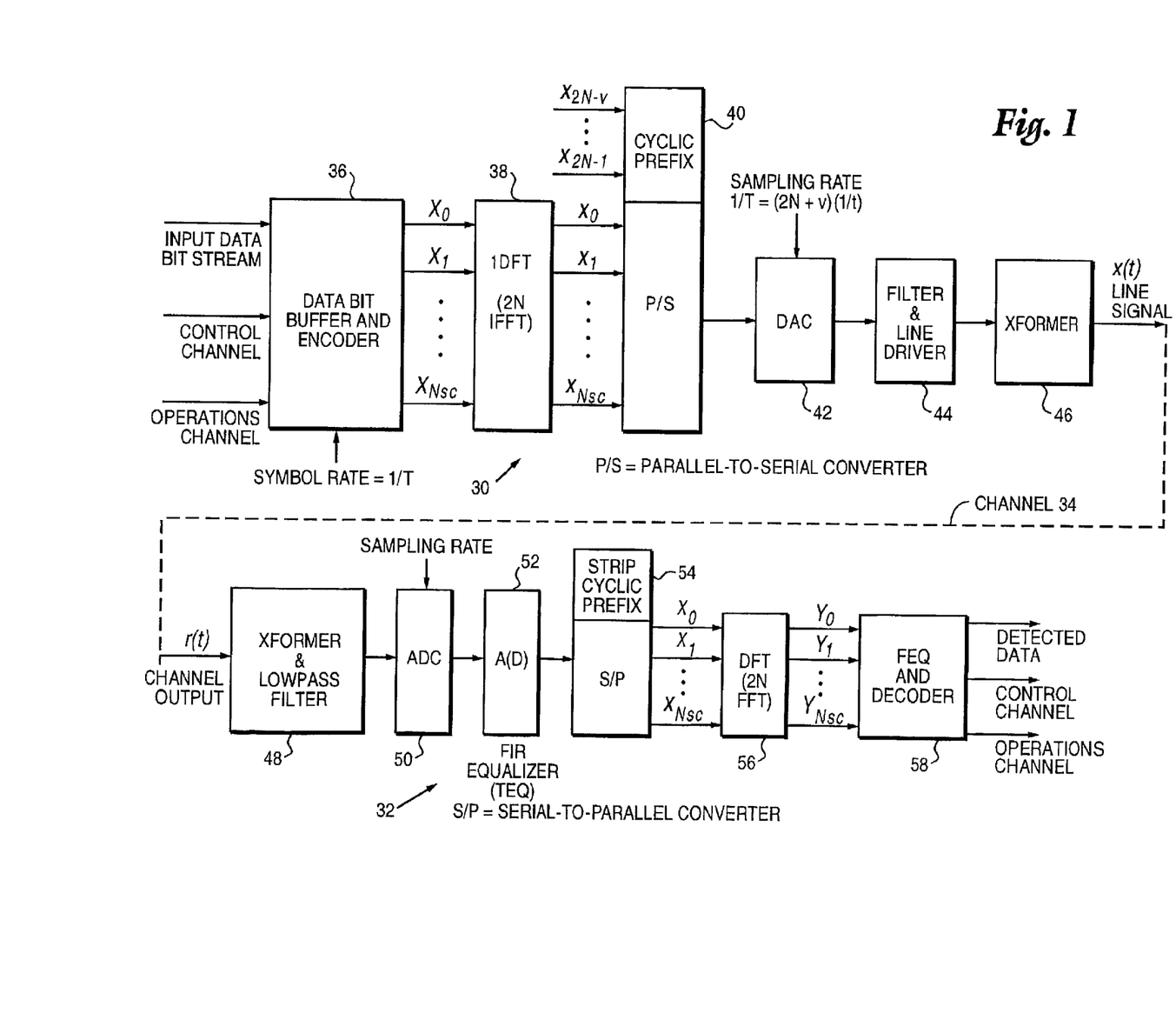
FIG. 1 illustrates one example of a discrete multitone communications system.

FIG. 1 illustrates a block diagram showing components of a basic DMT transmitter 30 and a basic DMT receiver 32 connected through a channel 34. Serial input data are grouped into blocks, converted to parallel form, and encoded by an encoder 36. Each one of the N active subchannels contains a number of bits allocated to that subchannel. Each of the N bit groups is mapped by the symbol into a two-dimensional signal constellation. The output from the encoder 36 is N complex numbers, one for each group of bits, which are then fed to a block 38 that calculates the inverse discrete Fourier transform (IDFT). The output is a real sequence that can be considered the superposing of N modulated orthogonal carriers a certain frequency apart. The IDFT output is converted back to serial format by a parallel-to-serial converter 40. The digitally modulated data stream is cyclically prefixed at 40, and converted to analog form by a digital-to-analog converter (DAC) 42. The analog signal is low pass filtered at 44, passed through a DC isolating transformer 46, and transmitted over a transmission channel 34.

At the receiver, the received analog signal is passed through a DC isolating transformer and a low pass filter 48, converted to digital form by an analog-to-digital converter (ADC) 50, pre-equalized in the time domain by a finite impulse response (FIR) filter 52 to limit the effective memory of the channel, and stripped of the cyclic prefix during post-receiver processing in a converter 54. The resulting digital signals are demodulated by a DFT block 56 that can be implemented as a 2N fast Fourier transform (FFT) operation, and converted to parallel frequency domain signals. Since the amplitude versus frequency and the delay versus frequency responses of the channel are not necessarily constant across the used frequency band, the received signal will differ from the transmitted signal, and the parallel inputs to the decoder 58 will differ from the corresponding parallel outputs from the encoder 36. A frequency domain equalizer (FEQ) compensates these differences and individually adjusts for the attenuation and delay of each of the carriers immediately before the parallel frequency domain signals are passed to the decoder (see generally block 58). The frequency domain equalized and decoded signals are converted back to serial form by the decoder. Ideally, the output serial data from the block 58 is the same as the input serial data to the encoder 36.

Figure 2:
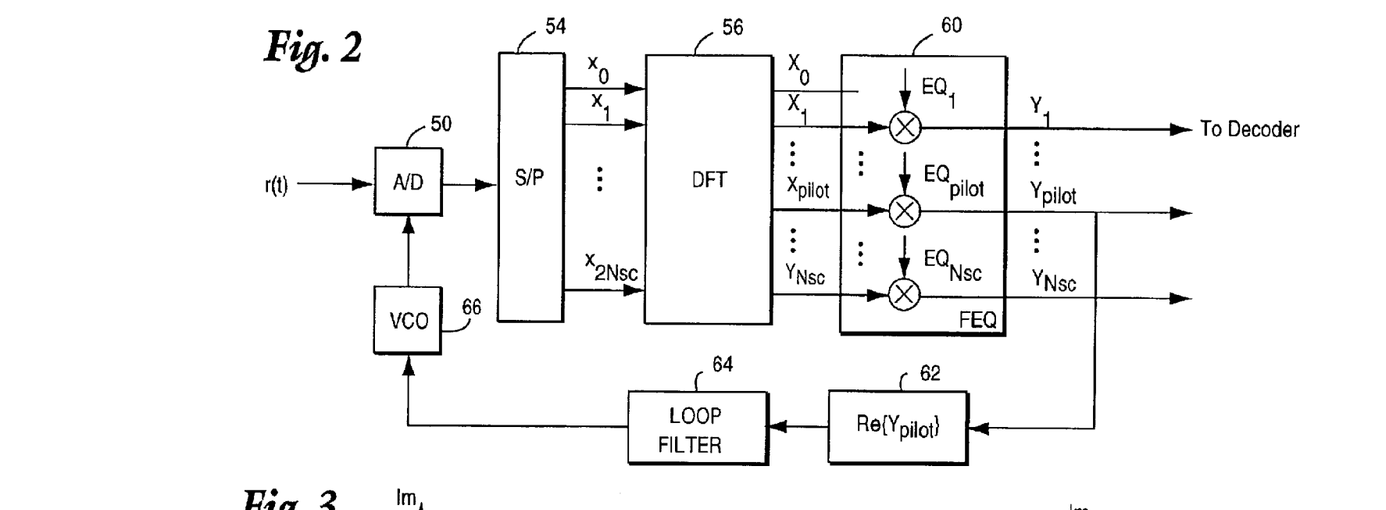
FIG. 2 illustrates a sampling rate recovery and tracking structure in a DMT receiver.

FIG. 2 illustrates a portion of the receiver 32 where a pilot tone is used to recover and track the sampling rate. The pilot tone is demodulated in the DFT block 56 to produce a complex signal $X_{pilot}$ which is equalized in the frequency equalizer (FEQ) 60 using an equalizer pilot coefficient or weight $EQ_{pilot}$ e to produce an equalized pilot signal $Y_{pilot}$. The equalized pilot signal is used in feedback control loop to adjust the sampling rate of the analog-to-digital converter 50. Block 62 extracts the real portion of the equalized complex pilot signal $Y_{pilot}$. The real portion of the signal $Y_{pilot}$ is filtered in a loop filter 64 before controlling a voltage-controlled oscillator (VCO) 66. The VCO 66 adjusts the analog-to-digital sampling rate. Thus, information about the misalignment of the pilot tone (i.e., any deviation in frequency or phase) is used in a phase-locked loop to lock the sampling rate of the A-D converter 50 to the sampling rate of the transmitter. The sampling rate determines the frequency of the transmitted pilot locked onto by the receiver.

Figure 3:
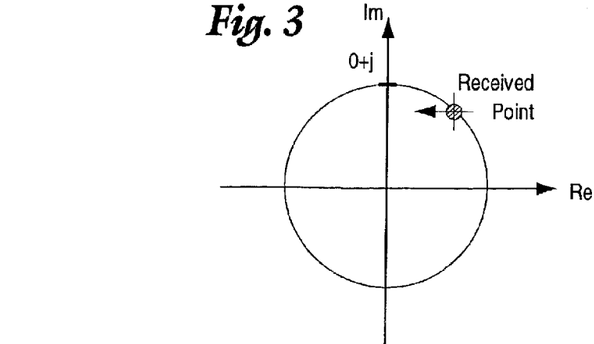
FIG. 3 illustrates a frequency domain pilot signal in the complex plane.

To recover and track the sampling rate, the control signal of the feedback loop has to track the frequency and phase of the pilot signal. The DFT block 56 provides that control signal on the pilot frequency. Consider the example in FIG. 3 which assumes that a complex symbol (0+j) corresponding to the pilot tone is transmitted by the transmitter 30. In the receiver 32, an attenuated and phase-shifted representation of this complex pilot symbol is recovered by the DFT 56. Since the real part of the transmitted pilot tone is known to be zero, the deviation of the real signal from zero may be used as the control signal for the feedback loop. In other words, the non-zero, real component is used as the feedback loop control signal.

Figure 4A:
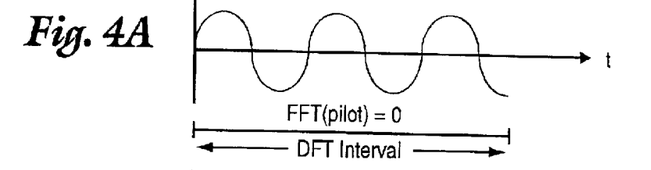
FIGS. 4A–4C illustrate a time domain pilot signal having different frequencies and/or phases.
Figure 4B:
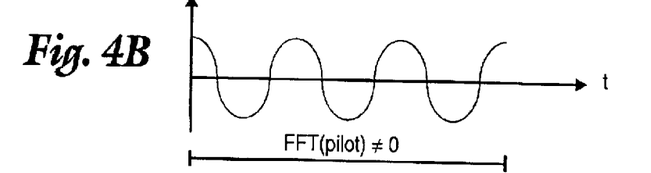
Figure 4C:
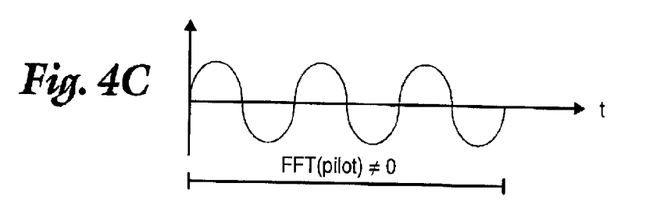

Another way of illustrating this concept is to consider the pilot signal in the time domain, as shown in FIGS. 4A–4C. The sinusoid in FIG. 4A has the correct phase because the first sample of the sinusoid in the DFT interval is zero. However, this sinusoid has the wrong frequency because the number of periods of the sinusoid in the DFT interval is not an integer. In FIG. 4B, the sinusoid has the correct frequency because the number of periods in the DFT interval is an integer, i.e., three. However, this sinusoid has the wrong phase. Both of the situations illustrated in FIGS. 4A and 4B lead to a non-zero, real part of the DFT output $Y_{pilot}$. In FIG. 4C, both the frequency and phase of the pilot are correct, and the real part of $Y_{pilot}$ is zero or close to zero. This same tracking scheme works when transmitting a signal (1+j) on the pilot frequency, instead of 0+j, since a fixed, de-rotation by 45° may be easily accomplished.

The frequency domain equalizer 60 may be viewed as a one tap, complex multiplication where the frequency domain sample is multiplied by its associated coefficient or weight. This coefficient is updated using an adaptive algorithm. The most common adaptive algorithm is the least mean squares (LMS) algorithm which, for a one tap complex structure, can be described using the following equation:

$$EQ_{k+1}=EQ_k+\mu \cdot X_k^* E_k, \tag{1}$$

where $EQ_k$ is the coefficient at time k, $X_k^*$ is the complex conjugate of the input frequency domain sample X at time k, $E_k$ is the frequency domain error at time k, and $\mu$ is the step size.

Figure 5:
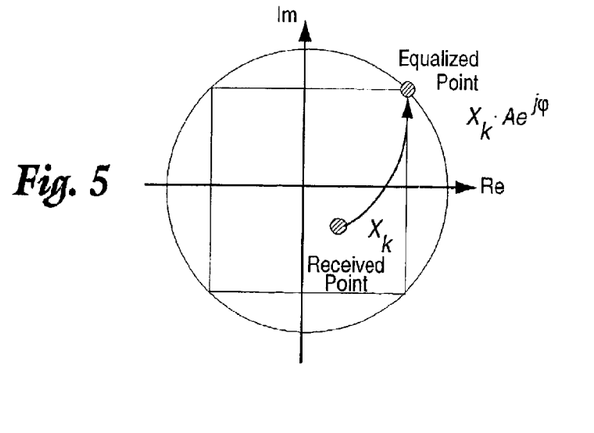
FIG. 5 is an illustration showing how a frequency domain equalizer compensates a received symbol for channel attenuation and phase distortion.

As is shown in the illustration of FIG. 5, the frequency domain equalizer 60 attempts to compensate for the channel attenuation and phase distortion by amplifying and shifting the phase of the received frequency domain sample represented as a signal point in the constellation diagram shown in FIG. 5. As explained above, compensating the pilot for the attenuation and phase distortion caused by the channel may adversely impact the pilot-based sampling rate recovery and tracking mechanism. The inventor recognized that the equalizer coefficient $EQ_k$ corresponds to a complex term $Ae^{j\Phi}$ which permits separate mechanisms to control the real and complex channels (I and Q channels) of the pilot tone in a DMT receiver. Consider for example an equalized point 0.5+1.25j in the complex plane. If the point moves along the imaginary axis, the value along the real axis is not changed. Similarly, movement along the real axis does not affect the value along the imaginary axis. Using these constraints, both frequency equalizer pilot coefficient adaptation and recovery/tracking of the transmitter sampling rate can be decoupled while still being achieved at the same time.

The adaptation of the pilot frequency domain equalizer coefficient and the tracking of the sampling rate are de-coupled by using the real part of the frequency domain equalizer output to the pilot to control the sampling rate and by using the imaginary part of the frequency domain equalizer output corresponding to the pilot to control the adaptation of the pilot frequency domain equalizer coefficient. The real and imaginary components could, of course, be used to perform the opposite functions. In a first non-limiting, example embodiment, only the imaginary part of the received pilot is equalized; the real part of the received pilot is not equalized. The equalizer error $E_k$ is assumed to be purely imaginary. The real part is then reinserted at the output of the frequency domain equalizer. Only the imaginary part is adapted by the equalizer. The unequalized, real part is used as a control signal for tracking the sampling rate. Accordingly, the present invention permits simultaneous timing recovery and equalization instead of a time-shared procedure between the two.

Figure 6:
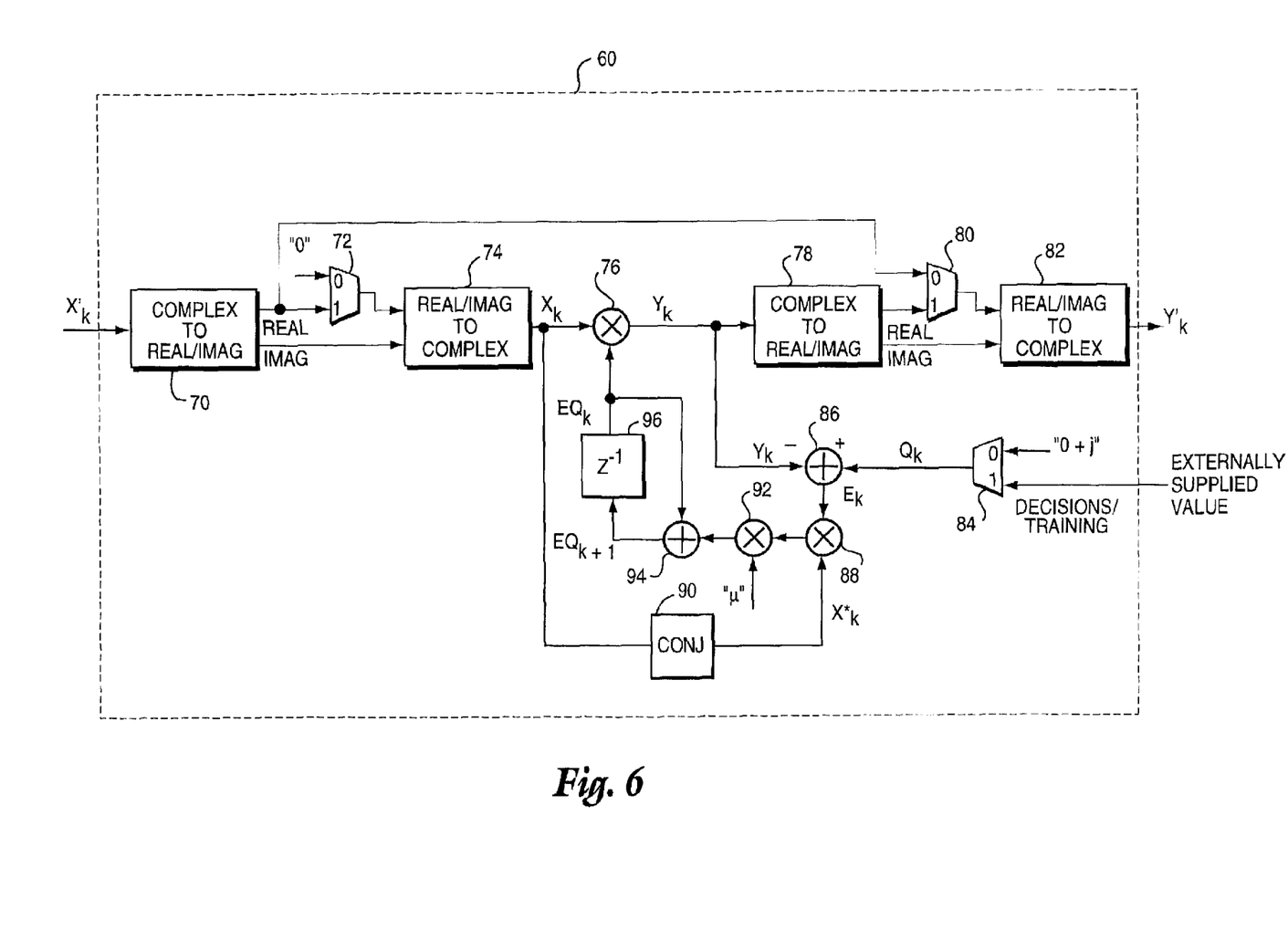
FIG. 6 illustrates an example, non-limiting embodiment of an equalizer that permits simultaneous equalization and sampling rate recovery and tracking.

FIG. 6 illustrates a first, non-limiting example of the invention implemented in frequency equalizer 60. The "0" branch of each multiplexer 72, 80, and 84 is chosen to process the pilot frequency, and the "1" branch is chosen for all other frequencies. The output of the DFT 56 is represented as $X_k'$. The complex pilot tone $X_{pilot}'$ (or other suitable known signal) is processed in block 70 to separate the real and imaginary components. When "0" is selected, the real part of the DFT output $X_{pilot}'$ is set to zero in multiplexer 72 and routed to multiplexer 80 unaffected by the equalization performed on the imaginary part of the pilot. The real part (set to zero for the pilot) and the processed imaginary part of $X_k'$ are converted back to a complex signal in block 74. Note that the blocks 70, 74, 78, and 82 converting between complex and real/imaginary components are conceptual blocks because complex numbers are typically represented as real/imaginary components in hardware implementations. The output of block 74 is then complex-conjugated in block 90 and supplied as $X_k$ to a multiplier 76. An error $E_k$ between the equalized pilot signal $Y_k$ and the value $Q_k$ is multiplied with $X_k^*$ in multiplier 88 and by the step size $\mu$ in multiplier 92 to generate the second term of equation (1) above, se., $\mu X_k^* E_k$. The value $Q_k$ is either the known, actually-transmitted pilot signal, where index k corresponds to the pilot frequency, or an externally supplied value for all frequencies other than the pilot frequency.

Thus, when training the equalizer at the pilot frequency, multiplexer 84 is in position "0," where $Y_k$ is subtracted from a predefined value, e.g., 0+j. For all other frequencies, the multiplexer 84 is in position "1," where an external value associated with those frequencies is used. These external values are either training values for the other frequencies, similar to the known value for the pilot frequency, or fed-back decisions based on the equalized values $Y_k$ for the other frequencies. As explained above, the output of multiplexer 84 $Q_k$ is a known transmitted signal, (i.e., in this example, either 0+j), or an externally supplied value.

The output of multiplier 92 is summed with $EQ_k$ in summer 94 to produce an updated equalizer coefficient $EQ_{k+1}$. The output from summer 94 is delayed in delay block 96 to produce $EQ_k$ for the next frequency domain sample. Multiplying $X_k$ by $EQ_k$ in multiplier 76 produces the equalized frequency domain sample $Y_k$, which is then separated into its real and imaginary components in block 78. The unequalized real component of the received signal pilot $X_{pilot}'$ is combined in multiplexer 80 with the equalized, imaginary component of the pilot and reformulated as a complex frequency domain sample $Y_k'$ in block 82.

Accordingly, adapting only the imaginary part of the equalizer coefficient for the pilot tone leaves the timing feedback control loop signal, i.e., the real part of the pilot, unaffected since no additional gain or phase adjustment is introduced by the frequency equalizer. This can be seen in FIG. 7 where the vector of correction is only in the vertical, imaginary direction; there is no horizontal, real-valued correctional component. However, there may be situations when it is desirable to have a horizontal, real-valued correctional component such as the situation now described.

It is desirable in many situations to control the transient response of the receiver's timing recovery feedback loop to ensure optimal performance. To achieve such control, pilot signal equalization should increase or decrease the gain of the feedback loop in a controlled manner. This may be accomplished by normalizing the amplitude of the timing control signal, i.e., the real component of the pilot signal. The coefficients of the feedback loop are chosen to provide a certain transient response deemed best for the system from some criteria trading off the duration of the transient response for accuracy in the end result. Accordingly, the coefficients of the loop have been chosen with some nominal value for the desired gain of the FEQ. Adaptation towards these nominal values means the loop all woks closer to the way intended instead of having some random gain in the loop.

To attain a tuning control signal with a normalized amplitude, the received pilot may be equalized in the "radial" direction in the complex plane. If both the real and the imaginary parts are scaled by the same amount, the effect is the same as introducing a real gain in the loop. In other words, the equalized vector will be updated in the radial direction. This approach does not employ a strict de-coupling, but rather a controlled coupling between equalizer updating and sampling rate control. One part of the pilot cannot decrease or increase independently of the other. If the received pilot point is updated to a larger radial value, the real value increases correspondingly, adding gain in the loop, which results in faster adaptation. Similarly, if the initial signal is too strong, the radial adaptation decreases the real value, causing a slower adaptation in the timing loop, but a more accurate end result. Both cases produce a gain for which the loop was designed.

Figures 7, 8:
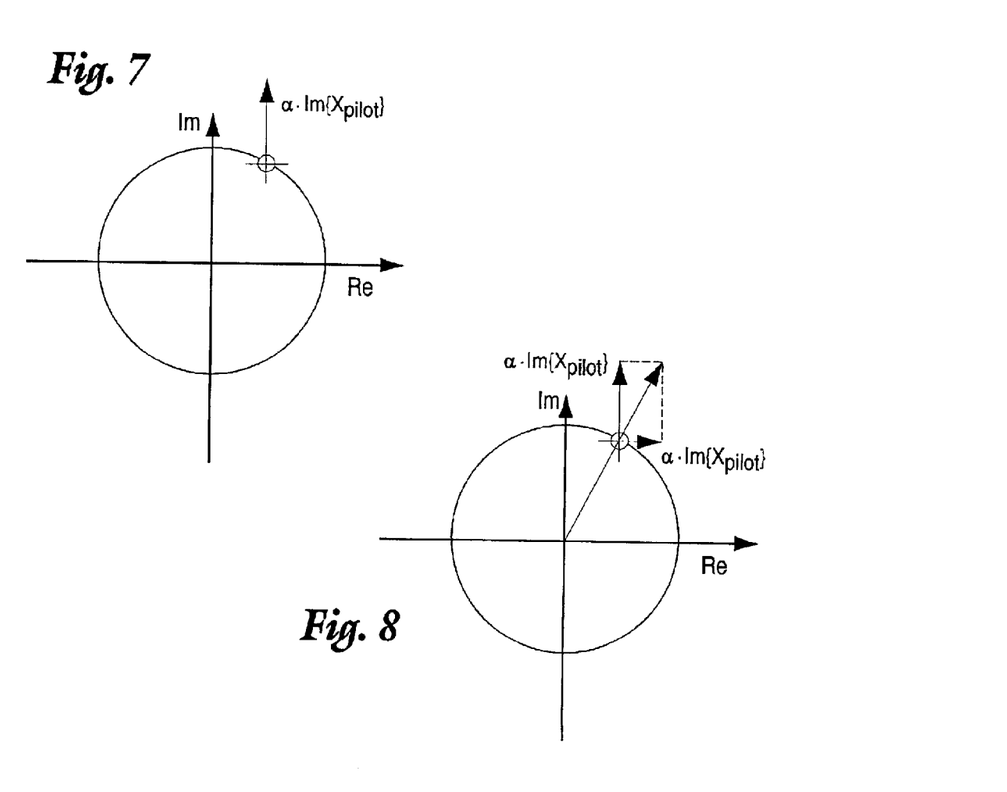
FIG. 7 illustrates the compensation of the equalizer shown in FIG. 6 in the complex plane.
FIG. 8 illustrates the compensation of the equalizer shown in FIG. 9 in the complex plane.

FIG. 8 illustrates the radial equalization of the pilot where both real (horizontal vector) and imaginary (vertical vector) components are equalized using the same value $\alpha$. In accordance with the second, example, non-limiting embodiment of the present invention, equalization of the pilot in the radial direction is performed in a controlled manner that also permits simultaneous, accurate timing recovery/tracking using the equalized real component of the pilot.

In this second example embodiment, the equalizer coefficient EQ that updates the imaginary part of the received pilot is purely real. However, some value other then the equalized real component of the pilot could be used. What is important is that radial adaptation is accomplished by updating the real and imaginary parts of the received pilot symbol by the same number. For example, the complex number 1+j is a vector of magnitude √2 and an angle 45° in the complex plane. If both real and imaginary parts are scaled by 3, the resulting vector is 3+j*3 having a magnitude of √18=2√3 but the same angle of 45°. This is expressed more generally as:

$$\alpha \cdot \text{real}\{X_{pilot}\} + j \cdot \alpha \cdot \text{imag}\{X_{pilot}\} = \alpha \cdot X_{pilot} \quad (2)$$

$$= \alpha \cdot |X_{pilot}| e^{j \text{imag}(X_{pilot})}$$

Again, FIG. 8 shows the resulting longer vector with the same angle.

To determine for what situations the equalizer coefficient is purely real, recall equation (1), i.e., $EQ_{k+1}=EQ_k+\mu \cdot X_k^* E_k$, and denote the received pilot frequency signal point as $$X_k'=X_{r,k}+jX_{1,k} \quad (3)$$

where $X_{r,k}$ and $X_{1,k}$ are the real and imaginary parts respectively for time instant k. For the pilot frequency, the real part is set to zero, as described in the above, so that the moified pilot symbol becomes $$X_k=0+jX_{1,k}=jX_{1,k} \quad (4)$$

The error is then defined as the difference between a known transmitted point $Q_k$ and the equalized received signal point $Y_k=EQ_k X_k$ $$E_k = Q_k - EQ_k X_k = Q_k - jEQ_k X_{i,k} \quad (5)$$

$$= Q_{r,k} + j(Q_{i,k} - EQ_k X_{i,k})$$

Using equations (1), (4), and (5), the updating term of the modified algorithm now becomes $$X_k^* E_k = -jX_{i,k}[Q_{r,k} + j(Q_{i,k} - EQ_k X_{i,k})] \quad (6)$$

$$= (-EQ_k X_{i,k}^2 + Q_{i,k} X_{i,k}) - jX_{i,k} Q_{r,k}$$

$$= (-EQ_{k,r} X_{i,k}^2 + Q_{i,k} X_{i,k}) - j(X_{i,k} Q_{r,k} + EQ_{k,i} X_{i,k}^2)$$

Suppose that the known signal point at the pilot is fixed $Y_k=0+jQ_1=jQ_1$ (i.e. independent of the time instant k). Equation (6) then simplifies to $$X_k^* E_k = (-EQ_{k,r} X_{i,k}^2 + Q_1 X_{1,k}) - jEQ_{k,1} X_{1,k}^2 \quad (7)$$

which means that if the constraint $EQ_{0,1}=0$ is put on the initial coefficient, the succeeding updating terms of the algorithm will be purely real, provided that $\mu$ is real. The resulting equalizer coefficient updating term is then given by $$X_k^* E_k = -EQ_{k,r} X_{i,k}^2 + Q_1 X_{1,k} \quad (8)$$

Figure 9:
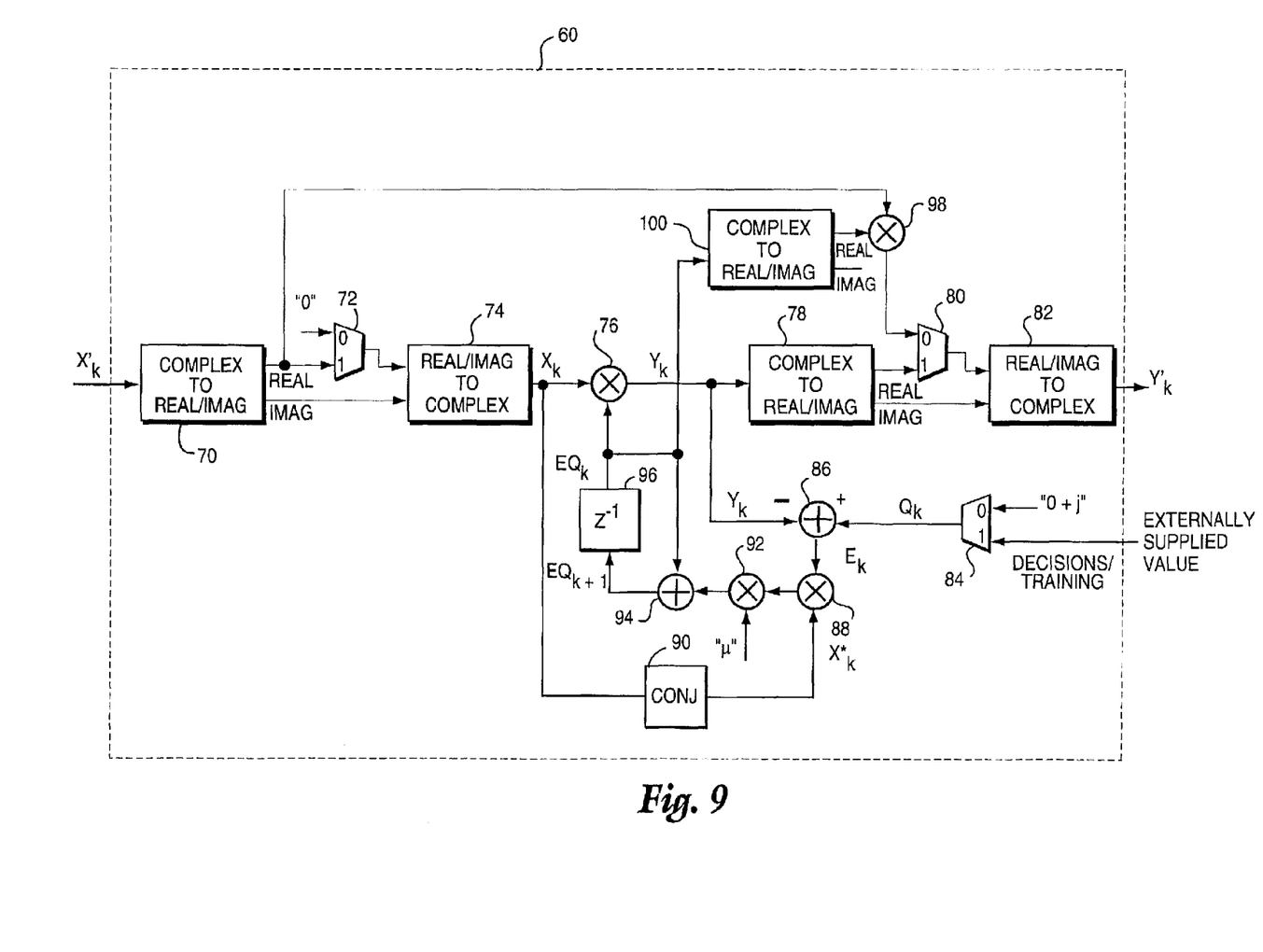
FIG. 9 is a function block diagram illustrating an equalizer in accordance with another non-limiting, example embodiment of the present invention that may be used for simultaneous equalization and sampling rate recovery and tracking.

FIG. 9 shows an example implementation of a one tap adaptive equalizer with radial adaptation for the pilot. Most of the blocks shown in FIG. 9 are similar to those in FIG. 6. However, a multiplier 98 multiplies the real component of the pilot $X_k'$ with the real part of the current pilot equalizer coefficient $EQ_k$ output by block 100. The product generated by multiplier 98 is provided via multiplexer 80 as the real portion of the signal $X_k'$ to block 82. The multiplier 76 multiplies the component of the imaginary component of the pilot $X_k'$ with the real part of the current pilot equalizer coefficient $EQ_k$ output by block 100. Thus, the same value is used to update both the real and imaginary parts of the received signal point. In essence, FIG. 9 implements equations (1)–(8).

Figure 10:
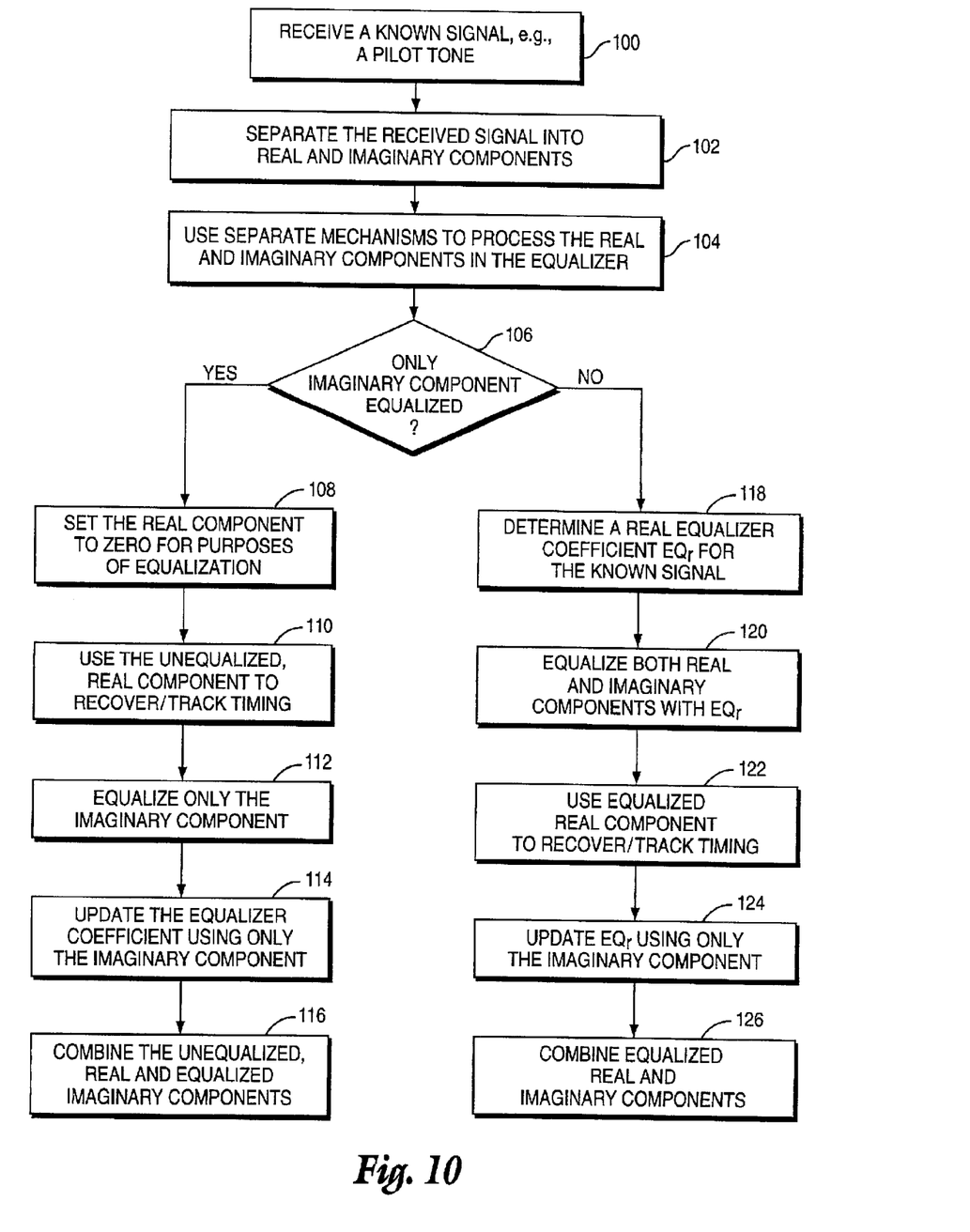
FIG. 10 is a flowchart diagram illustrating procedures for implementing an equalization procedure in accordance with an example of the present invention.
Figure 11:
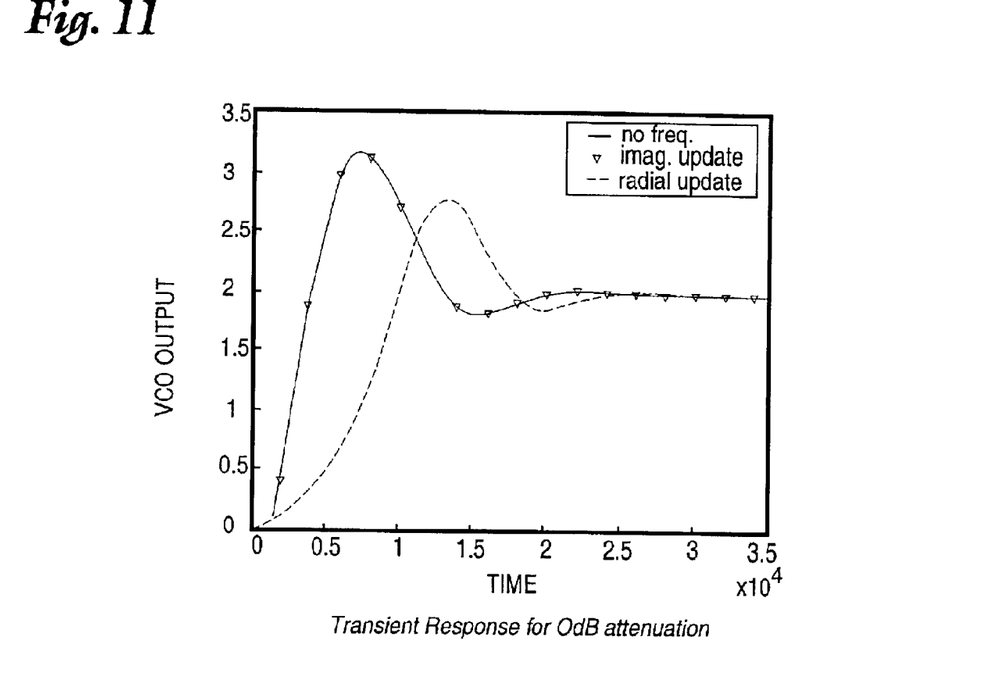
FIGS. 11–14 are graphs illustrating the transient response for different degrees of attenuation when no equalizer is used, when the example equalizer of FIG. 6 is used, and when the example equalizer of FIG. 9 is used.
Figure 12:
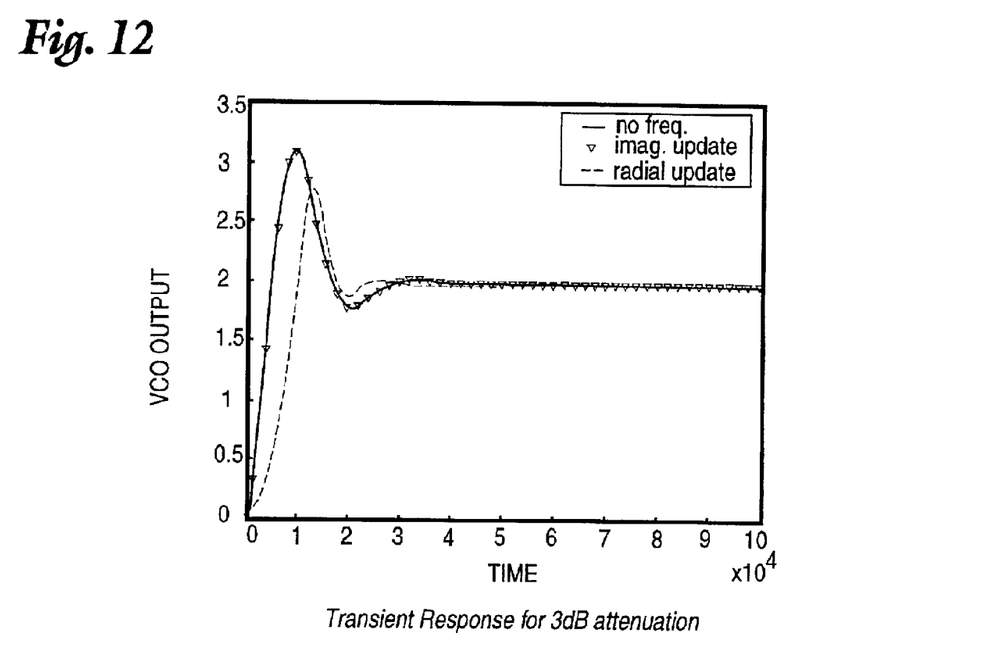
Figure 13:
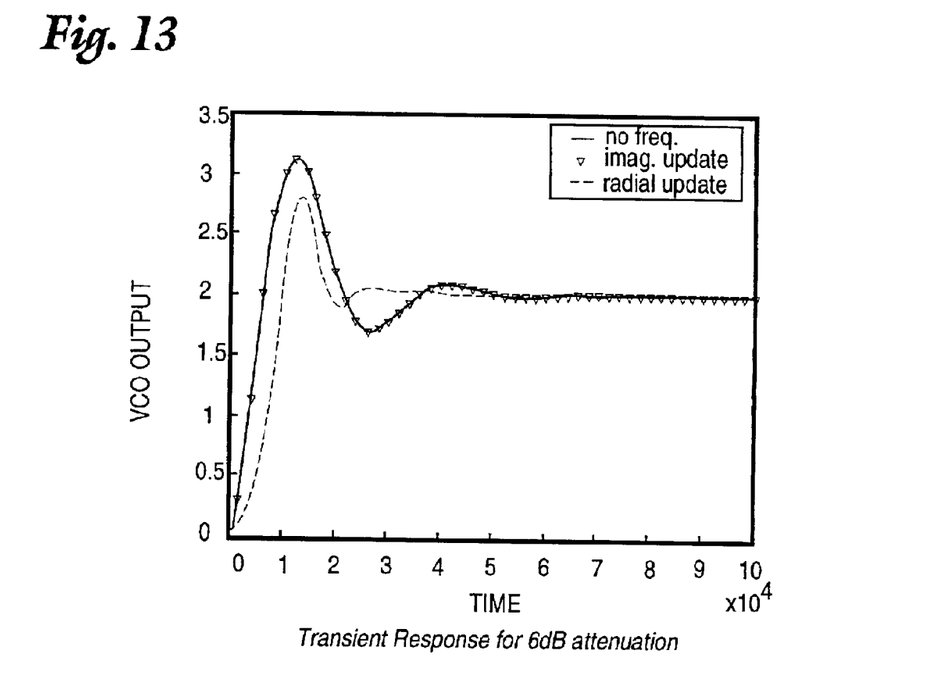
Figure 14:
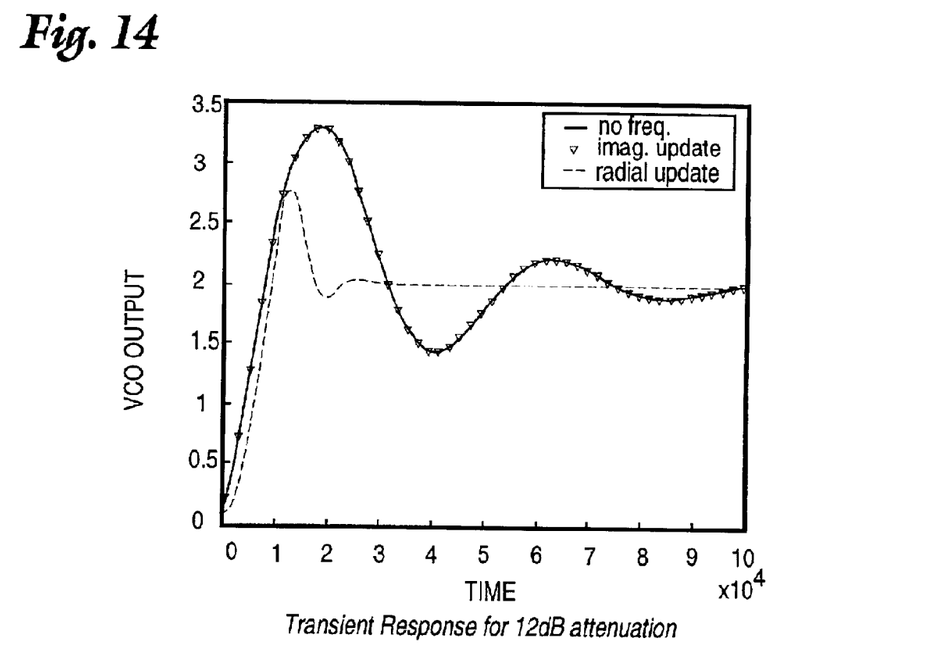

Procedures in accordance with an example of the present invention are now described in conjunction with the flowchart shown in FIG. 10. A known signal is received, e.g., a pilot tone (block 100). The received signal is separated into real and imaginary components (block 102). Separate mechanisms are used to process the real and imaginary components in the equalizer (block 104). This permits a decoupling of the adaptation of the known signal equalizer coefficient and recovering/tracking the sampling rate even though they are performed simultaneously. A decision is made in block 106 whether only the imaginary component of the known signal is to be equalized. If so, the real component of the known signal is set to zero for purposes of equalization (block 108). The unequalized real component of the known signal, e.g., the pilot tone, is used to recover/track the analog-to-digital converter's sample timing (block 110). Only the imaginary component of the known signal is equalized (block 112). The equalizer coefficient corresponding to the known signal is updated using only the imaginary component as described earlier (block 114). The unequalized, real component of the known signal and the equalized imaginary component of the known signal are then combined (block 116).

If both real and imaginary components of the known signal are to be equalized, a real-valued equalizer coefficient $EQ_r$ is determined for the known signal (block 118). Both real and imaginary components are equalized with that real-valued equalizer coefficient (block 120). The equalized real component is used to recover/track sampling rate timing (block 122). The real-valued equalizer coefficient is updated using only the imaginary component (block 124). The equalized real and imaginary components of the known signal are then combined (block 126).

FIGS. 11–14 show simulation results for three different situations: (1) when no frequency equalizer is used, (2) when updating of the frequency equalizer coefficient is performed only in the imaginary direction, and (3) when the update of the frequency equalizer coefficient is performed in the radial direction. These three structures are evaluated for four different levels of attenuation of the transmitted signal corresponding to 0 dB (no attenuation), 3 dB, 6 dB, and 12 dB, respectively. The "no frequency equalization" curve and the "imaginary only update" curves are identical as can be seen from the inverted triangles. The "radial update" curve is represented using a dashed line. The transient response of the imaginary only structure has the same transient response as when no frequency equalization is used for all four attenuation levels. For the no attenuation case, the duration of the transient response of the radial direction structure is longer than if no frequency equalizer is used. This is due to the fact that the frequency equalizer coefficient must adapt from its initial state (O in this case), while for the other two structures the gain is at the optimal level from the start. At 3 dB attenuation, however, an improvement of the duration of the transient response is observed. At 12 dB attenuation, the improvement is quite significant.

While the present invention has been described with respect to particular illustrative embodiments, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. A method for use in a receiver comprising:
    separating real and imaginary components of a received signal;
    equalizing the imaginary component of the received signal;
    using the real component of the received signal in controlling a timing in the receiver; and
    using the imaginary component but not the real component of the received signal in an equalization adaptation procedure.

2. The method in claim 1, wherein the received signal is a known signal.

3. The method in claim 1, wherein the received signal is a pilot tone.

4. The method in claim 1, wherein controlling the timing includes adjusting a sampling rate of the receiver for sampling the received signal.

5. The method in claim 1, wherein controlling the timing includes synchronizing the timing signal in the receiver with a timing signal in a transmitter that transmitted the signal received by the receiver.

6. The method in claim 1, wherein the equalization adaptation procedure includes updating an equalizer coefficient value.

7. The method in claim 6, wherein the imaginary component is equalized using the equalizer coefficient value.

8. The method in claim 7, further comprising:
    determining an error between an actual value of the received signal and the equalized imaginary component signal, and
    using the error to update the equalizer coefficient value.

9. The method in claim 6, wherein only the imaginary component of the received signal is equalized.

10. The method in claim 6, wherein both the real and imaginary components of the received signal are equalized.

11. The method in claim 2, further comprising:
    determining an equalizer coefficient value corresponding to the known signal, and
    updating both the real and imaginary components of the known signal with the equalizer coefficient value.

12. The method in claim 1, wherein the real component but not the imaginary component of the received signal is used in controlling the timing of the receiver.

13. The method in claim 1, wherein the receiver is a discrete multitone receiver, and the equalization procedure is implemented in the frequency domain.

14. The method in claim 1, further comprising:
    combining the real component and the imaginary component after equalization to generate a complex output signal.

15. The method in claim 1, wherein the real component is filtered and applied to a voltage controlled oscillator coupled to an analog to digital converter in the receiver.

16. A receiver, comprising:
    an analog-to-digital converter for sampling a received signal including a known signal;
    an equalizer for equalizing the sampled signal except for a real component of the known signal; and
    a timing control unit for controlling the analog-to-digital converter,
    wherein the real component of the known signal is used to control the timing unit.

17. The receiver in claim 16, wherein the receiver is a discrete multitone receiver employing plural subcarriers to convey information, and the equalizer is a frequency domain equalizer, the receiver further comprising:
    a serial to parallel converter converting an output of the analog to digital converter to parallel time domain samples corresponding the plural subcarriers, and
    a fast Fourier transform processor transforming the parallel time domain samples into parallel frequency domain samples which are provided to the frequency domain equalizer.

18. The receiver in claim 16, wherein the timing control unit is a voltage-controlled oscillator, and wherein the real component of the known signal is filtered.

19. The receiver in claim 16, wherein the equalizer sets the real component of the known signal to zero and equalizes an imaginary component of the known signal and adds the real component of the known signal to the equalized, imaginary component of the known signal.

20. The receiver in claim 19, wherein the equalizer adapts an equalizer coefficient corresponding to the known signal using the equalized, imaginary component of the known signal but not the real component of the known signal.

21. A receiver, comprising:
    an analog-to-digital converter for sampling a received signal including a known signal;
    an equalizer for equalizing the sampled signal, where the same equalizer coefficient is used to update both real and imaginary components of the known signal; and
    a timing control unit for controlling the analog to digital converter,
    wherein the equalized, real component of the known signal is used to control the timing unit, and
    wherein the same equalizer coefficient is a real-valued equalizer coefficient which is updated using the imaginary component but not the real component.

22. The receiver in claim 21, wherein the receiver is a discrete multitone receiver employing plural subcarriers to convey information, and the equalizer is a frequency domain equalizer, the receiver further comprising:
    a serial-to-parallel converter converting an output of the analog to digital converter to parallel time domain samples corresponding the plural subcarriers, and
    a fast Fourier transform processor transforming the parallel time domain samples into parallel frequency domain samples which are provided to the frequency domain equalizer.

23. The receiver in claim 21, wherein the timing control unit is a voltage-controlled oscillator, and wherein the real component of the known signal is filtered.

24. A receiver, comprising:
    an analog-to-digital converter for sampling a received signal including a known signal;
    an equalizer for equalizing the sampled signal including:
        a first mechanism to process a real component of the known signal, and
        a second mechanism to process an imaginary component of the known signal; and
    a timing control unit for controlling the analog to digital converter, wherein one of the first and second mechanisms is arranged to process one of the real and imaginary components of the known signal which has not been equalized to control the timing unit, and wherein the other of the first and second mechanisms is arranged to (a) permit equalization of the other of the real and imaginary components of the known signal by the equalizer, and (b) adapt the equalizer using only the other of the real and imaginary components of the known signal and recovery of a timing signal.

25. The receiver in claim 24, wherein the equalizer is arranged to update an equalizer coefficient corresponding to the known signal.

26. The receiver in claim 24, wherein the real component of the known signal is not equalized and the imaginary part of the known signal is equalized.

27. The receiver in claim 24, wherein the real component of the known signal and the imaginary component of the known signal are both equalized using the same equalizer coefficient.

28. The receiver in claim 24, wherein the one mechanism is arranged to use the real component of the known signal to control the timing unit.

29. The receiver in claim 24, wherein the first and second mechanisms are arranged so that the equalizer is updated in a radial direction.

30. The receiver in claim 24, wherein the second mechanism is arranged to set the real component of the known signal to zero so that only the imaginary part of the known signal is equalized, and wherein the first mechanism provides the unequalized real component of the known signal to control the timing unit.

31. The receiver in claim 24, wherein the first mechanism is arranged to equalize the real component of the known signal with a real-valued equalizer coefficient for controlling the timing unit, and wherein the second mechanism is arranged to equalize the imaginary component with the real-valued equalizer coefficient, the second mechanism being arranged to use the equalized imaginary component being used by the second mechanism to determine an equalizer error to modify the real equalizer coefficient.

32. The receiver in claim 24, wherein the known signal is a pilot tone.

33. The receiver in claim 24, wherein the timing unit timing is arrange to synchronize the timing signal in the receiver with a timing signal in a transmitter that transmitted the signal received by the receiver.

34. The receiver in claim 24, wherein the receiver is a discrete multitone receiver, and the equalizer is a frequency domain equalizer.

* * * * *